(12) United States Patent
Pelletier

(10) Patent No.: US 8,031,867 B2
(45) Date of Patent: Oct. 4, 2011

(54) METHOD OF VERIFYING THE INTEGRITY OF AN ENCRYPTION KEY OBTAINED BY COMBINING KEY PARTS

(75) Inventor: Hervé Pelletier, Cugy (CH)

(73) Assignee: MORPHO, Paris (FR)

( * ) Notice: Subject to any disclaimer, the term of this patent is extended or adjusted under 35 U.S.C. 154(b) by 353 days.

(21) Appl. No.: 12/376,928

(22) PCT Filed: Aug. 7, 2007

(86) PCT No.: PCT/FR2007/001348
§ 371 (c)(1),
(2), (4) Date: Jun. 2, 2009

(87) PCT Pub. No.: WO2008/023107
PCT Pub. Date: Feb. 28, 2008

(65) Prior Publication Data
US 2009/0316906 A1 Dec. 24, 2009

(30) Foreign Application Priority Data
Aug. 9, 2006 (FR) ...................... 06 07232

(51) Int. Cl.
*H04L 29/06* (2006.01)
*H04L 9/00* (2006.01)
*H04L 9/08* (2006.01)
*H04K 1/00* (2006.01)

(52) U.S. Cl. ............ 380/45; 380/29; 380/278; 380/259; 713/161

(58) Field of Classification Search .................. 380/277, 380/29, 45, 259; 713/161
See application file for complete search history.

(56) References Cited

U.S. PATENT DOCUMENTS
7,254,233 B2 * 8/2007 Hawkes et al. ................. 380/37
(Continued)

FOREIGN PATENT DOCUMENTS
CA 2327037 A1 * 5/2002
(Continued)

OTHER PUBLICATIONS
V. Gligor et al., On Message Integrity in Symmetric Encryption, Nov. 10, 2000, VDG Inc., Chevy Chase Maryland, Nov. 10, 2000.*
(Continued)

*Primary Examiner* — Nathan Flynn
*Assistant Examiner* — Carolyn B Kosowski
(74) *Attorney, Agent, or Firm* — Muncy, Geissler, Olds & Lowe, PLLC

(57) ABSTRACT

The method of verifying the integrity of an encryption key (K) obtained by combining at least two key portions (KM, M) in a protected zone (3) by using a commutative operator, comprises the steps of: using the commutative operator to perform a first combination between a key portion (KM) and a verification encryption key (Kv); using the commutative operator to perform in succession a combination between a key portion that has not yet been combined and a result obtained by an immediately preceding combination, until a last combination (Mv) is performed that includes all of the key portions; performing a combination in the protected zone (3) between the encryption key (K) to be verified and the last combination (Mv) of the verification encryption key (Kv) and the key portions (KM, M) in order to obtain a final verification key (Kf); encrypting verification data (Dv) by means of a symmetrical encryption algorithm (DES) using the final verification key (Kf); and making a comparison with a verification encryption (Cv) obtained by direct encryption of the verification data (Dv) by means of the verification encryption key (Kv).

2 Claims, 1 Drawing Sheet

U.S. PATENT DOCUMENTS

| | | | |
|---|---|---|---|
| 7,400,723 B2* | 7/2008 | Romain et al. | 380/28 |
| 7,502,475 B2* | 3/2009 | Chen et al. | 380/277 |
| 7,822,207 B2* | 10/2010 | Douguet et al. | 380/277 |
| 7,827,408 B1* | 11/2010 | Gehringer et al. | 713/170 |
| 2001/0046292 A1* | 11/2001 | Gligor et al. | 380/37 |
| 2002/0071552 A1* | 6/2002 | Rogaway | 380/37 |
| 2003/0103625 A1* | 6/2003 | Naccache et al. | 380/29 |
| 2004/0019782 A1 | 1/2004 | Hawkes et al. | |
| 2007/0086588 A1* | 4/2007 | England et al. | 380/28 |
| 2008/0152144 A1* | 6/2008 | Douguet et al. | 380/277 |
| 2008/0222420 A1* | 9/2008 | Serret-Avila | 713/176 |
| 2009/0074181 A1* | 3/2009 | Pelletier | 380/29 |
| 2009/0171878 A1* | 7/2009 | Zeng | 706/46 |
| 2009/0285398 A1* | 11/2009 | Liardet et al. | 380/277 |
| 2010/0169645 A1* | 7/2010 | McGrew et al. | 713/170 |

FOREIGN PATENT DOCUMENTS

WO      WO 01/82525 A1 * 11/2001

OTHER PUBLICATIONS

P. Rogaway et al., OCB: A Block-Cipher Mode of Operation for Efficient Authenticated Encryption, Department of Computer Science, University of California at Davis, California, USA, Aug. 3, 2001.*

C. Jutla et al., Encryption Modes with almost free message integrity, Advances in Cryptology-EUROCRYPT 2001. Lecture Notes in Computer Science, vol. 2045, B. Pfitzmann, ed., Springer-Verlag, 2001.*

* cited by examiner

METHOD OF VERIFYING THE INTEGRITY OF AN ENCRYPTION KEY OBTAINED BY COMBINING KEY PARTS

BACKGROUND OF THE INVENTION

1. Field of the Invention

The present invention relates to a method of verifying the integrity of an encryption key obtained by combining key portions and used in association with a symmetrical encryption algorithm.

2. Brief Description of the Related Art

It is known that an encryption algorithm operates by means of a key, which constitutes an element that is essential for ensuring that the encryption is secure.

Various means are known for attempting fraudulently to obtain the key associated with an encryption algorithm. One such means comprises analyzing electrical or electromagnetic phenomena that occur when the key is transferred from storage in a read-only memory to a read/write memory or from the read/write memory to a register. In order to combat that method of attack, it is known to subdivide the key into a plurality of portions, generally two portions, that are combined by means of an operator, e.g. the commutative EXCLUSIVE OR operator, in a read-protected zone in which the algorithm is implemented.

Another means for reconstituting the key consists in provoking disturbances in the key and in analyzing the consequences on the encryption of a data item that is used repetitively which provoking successive disturbances to the encryption key. To prevent an attacker from performing successive disturbances to the key, it would be desirable to be able to verify the integrity of the key when implementing the encryption algorithm. Unfortunately, combining key portions in a protected zone that is not accessible for reading prevents any reading back of the key in order to verify its integrity.

SUMMARY OF THE INVENTION

An object of the invention is to propose a method of verifying the integrity of an encryption key obtained by combining a plurality of key portions in a protected zone by using a commutative operator in association with a symmetrical encryption algorithm.

In order to achieve this object, the invention provides a method comprising the steps of: using the commutative operator to perform a first combination between a key portion and a verification encryption key; using the commutative operator to perform in succession a combination between a key portion that has not yet been combined and a result obtained by an immediately preceding combination, until a last combination is performed that includes all of the key portions; performing a combination in the protected zone between the encryption key to be verified and the last combination of the verification encryption key and the key portions in order to obtain a final verification key; encrypting verification data by means of a symmetrical encryption algorithm using the final verification key; and making a comparison with a verification encryption obtained by direct encryption of the verification data by means of the verification encryption key.

Thus, when the key to be verified has not been disturbed, the final verification key is equivalent to the verification encryption key, and the encryption of the verification data is then identical to the verification encryption. Otherwise, if the encryption key has been disturbed, then the final verification key is not equivalent to the verification encryption key and a difference is detected between the encryption of the verification data and the verification encryption. It is then possible to draw the conclusions therefrom, for example blocking the encryption algorithm so as to prevent an attacker from continuing the succession of tests that would enable the attacker to reconstitute the encryption key.

Preferably, at least one of the combinations preceding the last combination between the key portions and the verification key is performed outside the protected zone. This minimizes the means that need to be implemented in the protected zone.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus are not limitative of the present invention, and wherein the accompanying FIGURE illustrates the method of the invention diagrammatically.

DETAILED DESCRIPTION OF THE INVENTION

Figure 1:
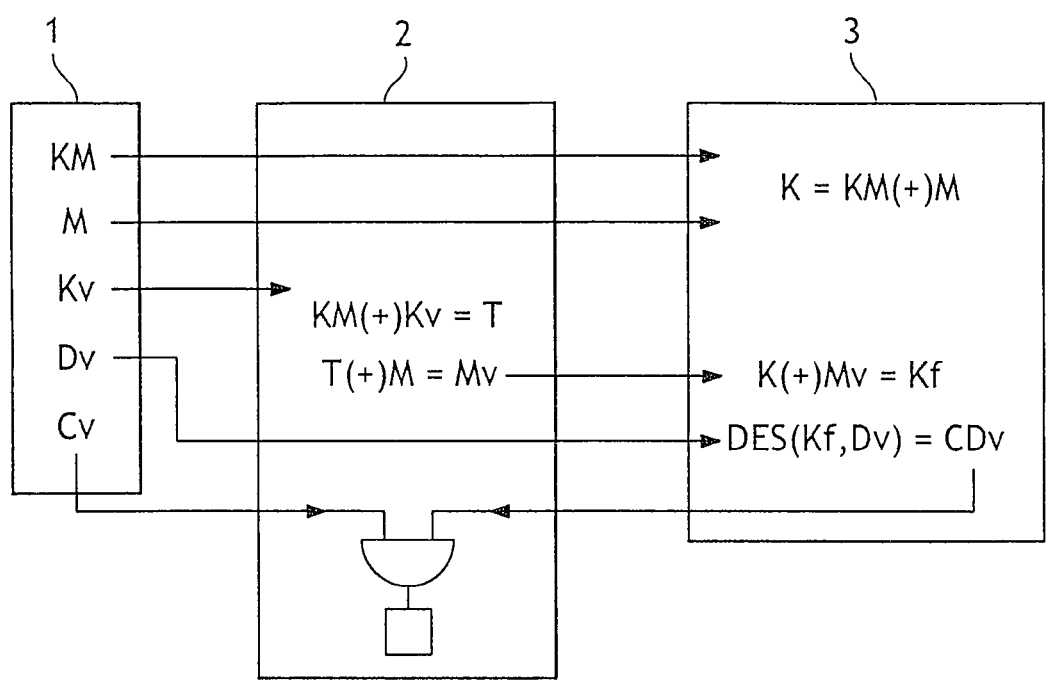

With reference to the FIGURE, the method of the invention is implemented by using means that are themselves known, comprising a static memory 1 such as an EEPROM, a read/write memory 2, and a register 3 forming a read-protected zone configured to implement a symmetrical encryption algorithm (DES, TDES, AES, ...) using an encryption key K. In known manner, the encryption key K is obtained by combining two key portions KM and M using a commutative operator such as the EXCLUSIVE OR operator which, in the equations below, is written (+).

For this purpose, the key values KM and K are read from the static memory into the read/write memory, and they are then transferred into the protected zone 3 where they are combined using the equation:

$$K = KM(+)M$$

It is recalled that the key K cannot be read in the protected zone 3.

In the invention, the static memory 1 also contains a verification encryption key Kv, verification data Dv, and a verification encryption Cv, the verification encryption Cv being previously obtained by direct encryption of the verification data by the encryption algorithm using the verification encryption key. When using a DES algorithm, this gives:

$$Cv = DES(Kv, Dv)$$

In order to cause a disturbance in the key K, it is possible for an attacker to act on the key portions KM and/or M while they are in the static memory or in the read/write memory.

In order to verify the integrity of the encryption key K contained in the register 3, the method of the invention comprises the steps of:

in the read/write memory 2, combining the verification encryption key Kv and a first key portion KM. This gives:

$$T = KM(+)Kv$$

making a second combination between the result obtained from the preceding combination and the second key portion M. In the implementation described, this produces a last combination Mv given by the equation:

$$Mv=T(+)M$$

combining the verification combination Mv in the protected zone 3 with the encryption key K to obtain a final verification key Kf given by the equation:

$$Kf=K(+)Mv$$

encrypting the verification data Dv by means of the symmetrical DES encryption algorithm, using the final verification key Kf to obtain an encryption of the verification data CDv such that:

$$CDv=DES(Kf,Dv)$$

comparing the resulting encryption CDv of the verification data with the verification encryption Cv extracted from the static memory 1.

It should be observed that if the formula for the final verification key is written out in full, the fowling is obtained:

$$Kf=K(+)KM(+)Kv(+)M$$

which taking account of the commutativity of the EXCLUSIVE OR operator can be written:

$$Kf=K(+)KM(+)M(+)Kv$$

If the initial data has not been subjected to an attack, then:

$$KM(+)M=K$$

and the expression for Kf becomes:

$$Kf=K(+)K(+)Kv=Kv$$

On the contrary, if one of the data items has been disturbed, then there is no longer identity between K and KM(+)M, such that the final verification key is then different from the verification encryption key Kv. The encryption of the verification data Dv with the final verification encryption key Kf then gives a result CDv that is different from the verification encryption Cv.

Comparing CDv and Cv thus makes it possible to detect an attack and to trigger defensive action, e.g. blocking the algorithm.

It should be observed that the method of the invention makes it possible not only to verify the integrity of the encryption key K, but also, when an attack has been made on the verification encryption key Kv, to verify the verification data Dv or the verification encryption Cv.

Although the primary object of the invention is not detecting an attack on this data, the invention nevertheless makes it possible to respond so as to avoid the attack bearing subsequently on the data relating to the key portions KM or M.

Naturally, the invention is not limited to the implementation described and variant implementations can be applied thereto without going beyond the ambit of the invention as defined by the claims.

In particular, although the invention is described with a key in two portions only, the method of the invention can be applied to a key that is recombined from an arbitrary number of key portions by using a commutative operator and a symmetrical encryption algorithm.

Although the steps of combining encryption key portions KM and M with the verification key Kv are described as being performed in the read/write memory 2, it is also possible to perform them in the protected zone 3, however that pointlessly monopolizes the computation resources of the protected zone 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of verifying the integrity of an encryption key (K) obtained by combining at least two key portions (KM, M) in a protected zone (3) by using a commutative operator, the method comprising the steps of: using the commutative operator to perform a first combination between a key portion (KM) and a verification encryption key (Kv); using the commutative operator to perform in succession a combination between a key portion that has not yet been combined and a result obtained by an immediately preceding combination, until a last combination (Mv) is performed that includes all of the key portions; performing a combination in the protected zone (3) between the encryption key (K) to be verified and the last combination (Mv) of the verification encryption key (Kv) and the key portions (KM, M) in order to obtain a final verification key (Kf); encrypting verification data (Dv) by a symmetrical encryption algorithm using the final verification key (Kf); and making a comparison with a verification encryption (Cv) obtained by direct encryption of the verification data (Dv) by the verification encryption key (Kv).

2. The method according to claim 1, wherein at least one of the combinations preceding the last combination (Mv) between the key portions (KM, M) and the verification key (Kv) is performed outside the protected zone (3).

* * * * *